June 5, 1928.
T. A. HALL
ADJUSTABLE GAUGE
Filed Sept. 9, 1924
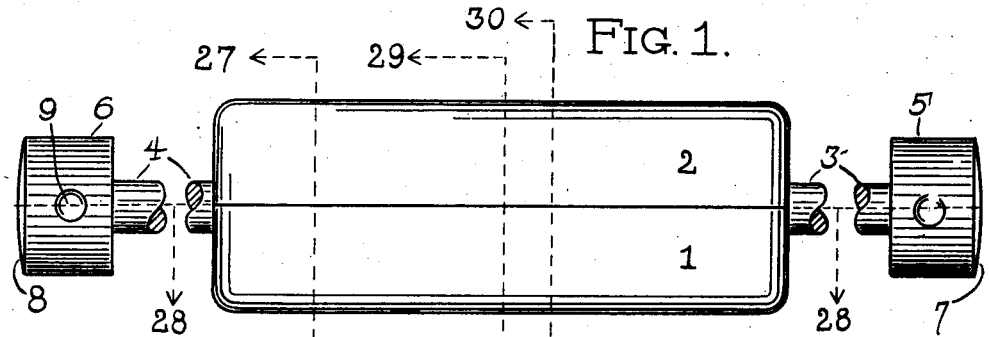
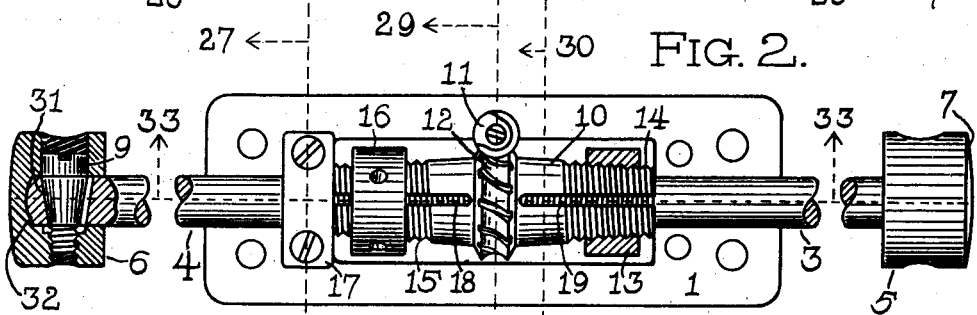
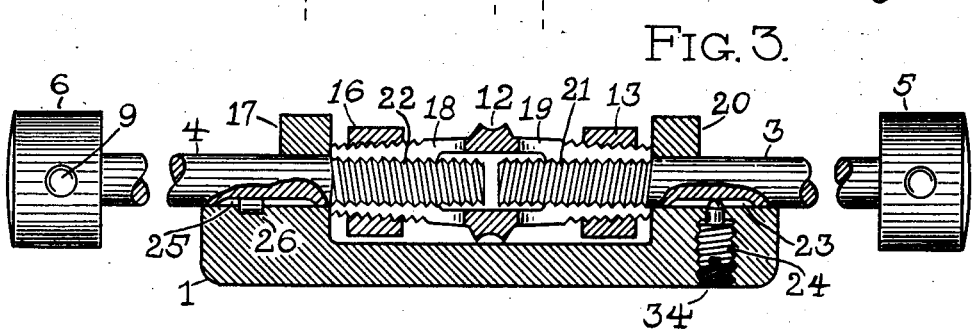
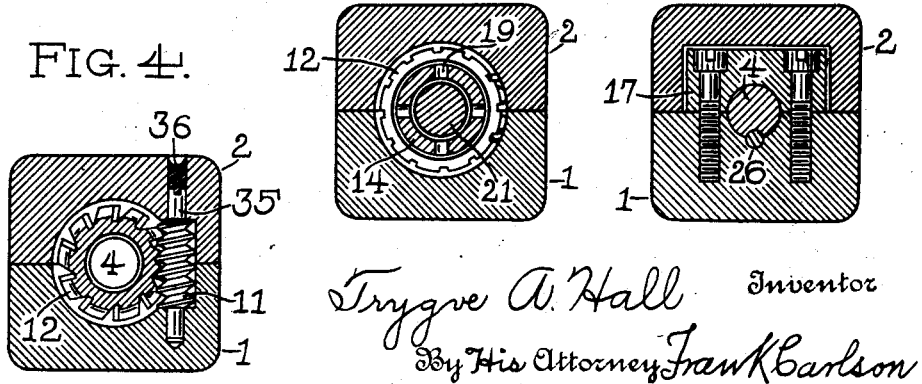
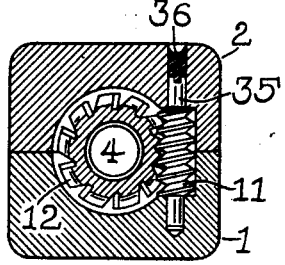
Trygve A. Hall  Inventor
By His Attorney Frank Carlson Patented June 5, 1928.

1,672,488

UNITED STATES PATENT OFFICE.

TRYGVE A. HALL, OF POUGHKEEPSIE, NEW YORK.

ADJUSTABLE GAUGE.

Application filed September 9, 1924. Serial No. 736,720.

The invention relates to gauges used to measure distances between points, and more especially to the class wherein a pair of contact anvils on the extremities of the instrument and the instrument itself are adjustable to different dimensions and for calibration to accurate standards, and for taking up wear on the anvils.

Incidentally, it is one object of the invention to provide a gauge which is practically indestructible, and is likewise adapted for a wide variety of uses within its sphere.

Other objects and attained advantages will appear hereinafter as this specification proceeds.

In the accompanying drawing:—

Fig. 1 is a view of a gauge made according to my invention.

Fig. 2 is another view of the same with the upper portion or cover removed and some parts in section on line 28—28.

Fig. 3 is a section of the body of Fig. 2 on line 33—33, with the extremities included for completeness.

Fig. 4 is a cross section of Fig. 1 on line 29—29.

Fig. 5 is a cross section of the same view on line 30—30.

Fig. 6 is also a cross section of the same first view on line 27—27.

Throughout the views, like reference numbers indicate the same parts.

In manufacturing machinery, resort is often had to scales, gauges and the like, and in the present case, to such gauges as are adapted to accurately measure distances between points, walls or other appurtenances.

The present invention is adapted for use in all the latter class of uses, and in the practice of my invention, a journalled casing 1 is provided with a cover 2, and together with the cover comprises a casing for a shaft or rod 3 at one extremity and for a similar rod 4 at the other. A pair of bearing blocks 20 and 17 assist in retaining the shafts in position even if cover 2 is removed. The shafts are provided at the outer ends with contact anvils 5 and 6, and at the inner ends, the shaft 3 has a left hand thread 21, and shaft 4 a right hand thread 22. A turnbuckle 10 is fitted on the threads and has a plurality of slots similar to 18 and 19 in both extremities, while a gear 12 occupies the middle portion.

The turnbuckle is provided on the ends with tapered threads 14 and 15, and a pair of corresponding nuts 13 and 16 are mounted on the threads whereby to tighten the turnbuckle on the shafts. The nuts also serve the purpose of preventing the spread of the slotted portions of the turnbuckle in any undue manner. In order to obtain a finer and more reliable movement, a worm 11 having a shank 35 has been inserted to engage the gear. The shank is adapted for engagement by a common screw driver by which the worm may be turned.

The anvils 5 and 6 are provided with outer hard faces 7 and 8, which are the wearing surfaces of the instrument. But in order to insure absolute accuracy and absence of play between the anvils and the bar extremities upon which they are mounted, the anvils are secured to the bars by tapered screws. One of these screws is shown at 9, where the tapered portion 31 is adapted to wedge the end of shaft 4 against the inner face of the anvil 6 at 32.

If the instrument is used between two spaced points whose relative distance is in doubt regarding accuracy, the instrument is handled like any scale or straight gauge whose length is the sole criterion of its usefulness. The outer faces of the anvils take the wear, and when worn beyond the limit of accuracy, a screw driver may be inserted to engage shank 35 of the worm, thereby turning the same and the gear and turnbuckle till the faces of the anvils are exactly the right distance apart.

In order to prevent the shafts or rods from turning with the turnbuckle, a pair of long slots have been provided at 23 and 25 in the rods. In the case of rod 3, a screw 24 has been provided in the casing with the extremity projecting into slot 23, while in the other rod, a key partly projects into the slot 25 from the casing. Keys and screws in this relation are interchangeable and, of course, it is optional which are used. However, they prevent the rotation of the shafts, while permitting longitudinal movement in either direction, according to the rotation of the turnbuckle.

When the instrument has been properly calibrated by thus manipulating the various parts, the nuts 13 and 16 are tightened, this practically locking the turnbuckle on the shafts, and then the cover 2 may be replaced. The calibration screws and other parts similar to 9, 24 and 35 may be sealed against alteration or movement by sealing wax as at 34 and 36, insuring accurate settings which cannot be tampered with or otherwise rendered inaccurate during the normal run of work and usage.

Having thus fully described my invention, I claim:

1. A gauge comprising a casing, a pair of rods slidably mounted in alignment in said casing and projecting from the extremities thereof, a turnbuckle in said casing connecting the inner extremities of said rods, there being open slots in the extremities of the turnbuckle, threads on both ends of said turnbuckle and a nut on each thread whereby to tighten said turnbuckle on said rods, and a cover for said casing.

2. A gauge comprising a casing having a pair of rods slidably mounted in alignment and projecting from said casing, a longitudinally slotted portion in each rod and a screw in the casing projecting into each of said slotted portions to prevent rotation of said rods, a turnbuckle in said casing mounted on the inner extremities of said rods to connect the same, means to rotate said turnbuckle and a cover for said casing.

3. A gauge comprising a casing, a pair of rods mounted in alignment in said casing and projecting from the extremities thereof, means to prevent the rotation of said rods, a turnbuckle mounted on said rods within the casing, a cover for said casing and means in said casing to rotate said turnbuckle including a gear upon the turnbuckle and a worm engaging the gear.

4. A gauge comprising a casing and a cover therefor, a pair of aligned rods mounted in said casing and projecting from the extremities thereof, a turnbuckle in said casing connecting said rods, and a bearing block adjacent each extremity of the casing securing each of said rods in position and adapted to project into said cover.

5. A gauge comprising a casing, a pair of aligned rods mounted in the casing and projecting from the extremities thereof, a thread on the inner extremity of each of said rods, a turnbuckle mounted on said threads within said casing and having a slotted section upon each extremity thereof, a thread upon each said turnbuckle extremity and a locking ring mounted on each of said threads, means to rotate said turnbuckle, means to limit movement of said turnbuckle including end walls upon said casing and guide means in said end walls to prevent rotation of aforesaid rods.

6. A gauge comprising a casing and a cover thereon, a pair of aligned rods threaded upon their inner extremities and mounted in said casing with their extremities projecting therefrom, a turnbuckle mounted on said rods within the casing, means to rotate said turnbuckle, means to locate said turnbuckle in the casing comprising end walls in the latter, guides for said rods in said end walls and bearing blocks upon said end walls to retain said rods in position in said casing.

7. A gauge comprising a casing provided with end walls and a cover, a bearing block on each of said end walls within the respective extremity of the casing and adapted to project into said cover, a pair of aligned rods mounted in said end walls to project from the extremities of said casing and retained by said blocks, threads upon the inner extremities of said rods within the casing and a turnbuckle mounted on said rod threads in said casing connecting the rods, means in said end walls adapted to project into slots in said rods to guide the same in movement and to prevent rotation thereof, and means to rotate said turnbuckle comprising a gear mounted on the same and a worm in said casing in engagement with said gear and provided with an extension adapted to be engaged by a tool whereby to rotate said worm and gear, and contact means upon the outer extremities of aforesaid rods.

Signed at the city of Poughkeepsie, county of Dutchess this 30th day of August, 1924.

TRYGVE A. HALL.